March 11, 1941.    H. RIEPERT    2,234,578
COOLING CHAMBER FOR MICROSCOPES
Filed June 21, 1939
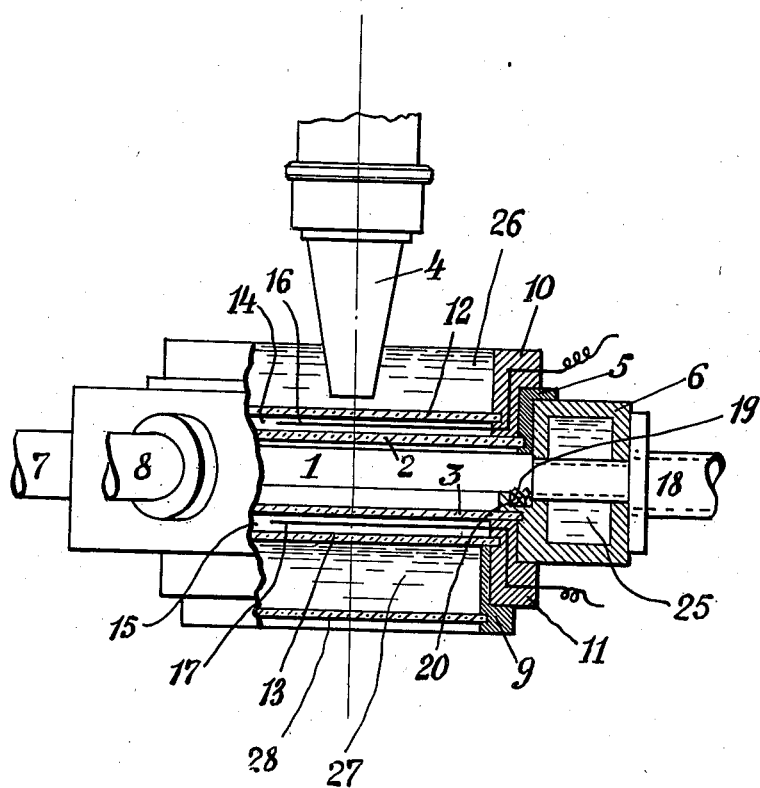
Hermann Riepert
INVENTOR.
BY Ivan E. A. Konigsberg
ATTORNEY.

Patented Mar. 11, 1941

2,234,578

UNITED STATES PATENT OFFICE 2,234,578

COOLING CHAMBER FOR MICROSCOPES

Hermann Riepert, Wetzlar, Germany, assignor, by mesne assignments, to Frank Dumur, Lausanne, Switzerland Application June 21, 1939, Serial No. 280,257
In Germany June 30, 1938

4 Claims. (Cl. 88—40)

This invention relates to improvements in cooling chambers for microscopes. The object of the invention is to provide means for preventing the formation of a precipitate upon the glass plates which close the object space in a cooling attachment or device in a microscope. When the cooling device starts to operate, precipitation occurs upon said glass plates from moisture which remains in the object space. The glass plates therefore become fogged and obscure or prevent observation of the object.

It has been proposed to place hygroscopic chemicals in the object space in order to eliminate the formation of a precipitate or fogging of the glass plates. It has also been proposed to heat the glass plates by electricity. Such means may be sufficient to prevent fogging from the inside of the object space and electricity may also under certain conditions suffice as a heating means to be used upon the outside of the glass plates.

In order to insure that precipitation does not also occur upon the outside of the glass at whatever temperature may prevail, this invention is embodied in a cooling chamber device which includes chambers arranged above and below the glass plates and adapted to contain suitable liquids having a very low freezing point and which do not influence the image forming rays with respect to light intensity or color. Such arrangements may be combined with heating wires or the use of hygroscopic chemicals. The liquid containing chambers may be arranged to contain liquids having different freezing points.

The invention is illustrated in the accompanying drawing which shows a view, partly in section and partly in elevation, of a cooling chamber arrangement for microscopes according to this invention. The cooling chamber 1 is formed within a ring formed supporting member 5 which supports glass plates 2 and 3 which form the top and the bottom of the chamber 1. On the outside of the ring formed member 5 there is suitably supported an annular cooling jacket 6 having inlet and outlet 7 and 8 for supplying and draining the cooling liquid 25. The ring 5 and the jacket 6 may be integral. The space above the top glass plate 2 and within the member 5 may now be filled with a liquid having the properties described above. Below the bottom glass plate 3 a vessel 9 may be placed containing the same or a different liquid. The vessel 9 has a bottom 28 of glass or other material and a suitable liquid 27 is contained within the vessel 9.

This construction permits of further development of the invention. For instance within the member 5 and above the cooling chamber 1 there may be placed a ring 10 having a glass plate 12 spaced to form a heating chamber 14 containing electric heating elements 16 suitably insulated. Liquid 26 may be contained within the ring 10 as shown.

A similar arrangement may be used below the cooling chamber 1. A ring 11 having a glass plate 13 may be placed below the cooling chamber bottom 3, the plate 13 also being spaced to provide a heating chamber 15 with heating elements 17. Then the vessel 9 may be placed within the ring 11.

The moisture in the chamber 1 may be evaporated through a pipe 18.

Hygroscopic chemicals 19, for instance calcium chloride, may be placed within an annular recess 20 in the cooling chamber as shown. The liquids 26 and 27 having suitably selected freezing points serve as cooling layers to still further prevent the formation of a precipitate according to the prevailing temperature.

I claim:

1. A cooling chamber for microscopes comprising, a ring formed member having a glass top and a glass bottom forming a cooling chamber, means preventing the formation of a precipitate upon the outside of said glass top and bottom, said means comprising an open vessel having a glass bottom supported above said glass top and another vessel having a glass top and a glass bottom supported below said glass bottom, said vessels containing selected liquids for the purpose set forth, said cooling chamber being positioned in optical alinement with the microscope for observation through the glass bottom of said open vessel.

2. In a microscope, a ring formed member having a glass top and a glass bottom forming a cooling chamber, a liquid containing cooling jacket surrounding said cooling chamber and supported in said ring formed member, means establishing communication between said cooling chamber and the outside of said microscope, means preventing the formation of a precipitate upon the outside of said glass top and bottom, said means comprising a vessel supported above said glass top and another vessel supported below said glass bottom, said vessels containing selected liquids for the purpose set forth.

3. In a microscope, a supporting member, an upper and a lower glass plate therein to form a cooling chamber within said member, a vessel within said supporting member above said upper glass plate, a glass bottom in said vessel spaced to form a heating chamber above said upper glass plate, a ring formed member within said supporting member, a glass plate in said ring formed member spaced to form a heating chamber below said lower glass plate, heating elements within said heating chambers and a vessel within said ring formed member below the said glass plate therein.

4. In a microscope, means forming a cooling chamber centered in the optical axis of the microscope, said chamber having a glass top and a glass bottom, devices preventing the formation of a precipitate on the outside of said glass top and glass bottom, said devices comprising supporting members placed above and below said cooling chamber and spaced glass plates within said supporting members forming heating chambers above said cooling chamber top and below said cooling chamber bottom, said glass plates also forming with said supporting members vessels above and below said heating chamber, and heating elements within the latter.

HERMANN RIEPERT.